US009548928B2

(12) United States Patent
Iwata (10) Patent No.: US 9,548,928 B2
(45) Date of Patent: Jan. 17, 2017

(54) NETWORK SYSTEM, CONTROLLER, AND LOAD DISTRIBUTION METHOD

(71) Applicant: Yuichiro Iwata, Tokyo (JP)

(72) Inventor: Yuichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/383,643

(22) PCT Filed: Mar. 6, 2013

(86) PCT No.: PCT/JP2013/056089
§ 371 (c)(1),
(2) Date: Sep. 8, 2014

(87) PCT Pub. No.: WO2013/133303
PCT Pub. Date: Sep. 12, 2013

(65) Prior Publication Data
US 2015/0078166 A1    Mar. 19, 2015

(30) Foreign Application Priority Data
Mar. 8, 2012 (JP) .................. 2012-051397

(51) Int. Cl.
*H04L 12/28* (2006.01)
*H04L 12/803* (2013.01)
(Continued)

(52) U.S. Cl.
CPC ......... *H04L 47/125* (2013.01); *H04L 43/0817* (2013.01); *H04L 45/22* (2013.01); *H04L 49/50* (2013.01)

(58) Field of Classification Search
CPC .......... H04L 45/22; H04L 43/16; H04L 45/10; H04L 45/28
See application file for complete search history.

(56) References Cited

U.S. PATENT DOCUMENTS 6,643,254 B1 * 11/2003 Kajitani ................. H04L 45/10
370/217
8,050,260 B1 * 11/2011 Dropps ................. H04L 69/22
370/237

(Continued)

FOREIGN PATENT DOCUMENTS

CN    102349268 A    2/2012
JP    2009-284434 A   12/2009

(Continued)

OTHER PUBLICATIONS

English Translation of International Preliminary Report on Patentability in PCT No. PCT/JP2013/056089 dated Sep. 9, 2014.

(Continued)

*Primary Examiner* — Andrew Lee
(74) *Attorney, Agent, or Firm* — McGinn IP Law Group, PLLC (57) ABSTRACT

A network system has a switch which transfers a packet and a controller which sets a flow entry to the switch. The controller has a heavy load switch detecting section which detects a heavy load switch with the heavy load of new flow entry setting processing; a storage section which stores a switch list; an alternate route searching section which searches an alternate route; and a flow entry setting section which assigns a flow of packets to be transferred by using a new flow entry of the heavy load switch to the switch on the alternate route, without changing the flow entry which is already set to the heavy load switch.

19 Claims, 11 Drawing Sheets

(51) Int. Cl.
*H04L 12/931* (2013.01)
*H04L 12/707* (2013.01)
*H04L 12/26* (2006.01)

(56) References Cited

U.S. PATENT DOCUMENTS

| | | | |
|---|---|---|---|
| 2001/0034790 A1* | 10/2001 | Sato | H04L 45/22 709/235 |
| 2003/0058880 A1* | 3/2003 | Sarkinen | H04L 12/5693 370/413 |
| 2007/0041323 A1* | 2/2007 | Kitahara | H04L 43/0882 370/235 |
| 2010/0027420 A1* | 2/2010 | Smith | H04L 43/16 370/235 |
| 2011/0058571 A1* | 3/2011 | Bloch | H04L 49/3036 370/428 |
| 2011/0261811 A1* | 10/2011 | Battestilli | H04L 47/125 370/389 |
| 2011/0261825 A1 | 10/2011 | Ichino | |
| 2011/0267952 A1* | 11/2011 | Ko | H04L 43/0864 370/237 |
| 2011/0273988 A1 | 11/2011 | Tourrilhes et al. | |
| 2011/0286324 A1 | 11/2011 | Bellagamba et al. | |
| 2012/0075999 A1* | 3/2012 | Ko | H04L 43/0858 370/238 |
| 2014/0119193 A1* | 5/2014 | Anand | H04L 45/28 370/237 |

FOREIGN PATENT DOCUMENTS

| | | |
|---|---|---|
| JP | 2010/161473 A | 7/2010 |
| JP | 2011-151718 A | 8/2011 |
| JP | 2011-166384 A | 8/2011 |
| JP | 2011-170718 A | 9/2011 |

OTHER PUBLICATIONS

International Search Report (ISR) (PCT Form PCT/ISA/210), in PCT/JP2013/056089, dated Apr. 23, 2013.
European Search Report dated Oct. 14, 2015.
Battestilli, et al., "High-Performing Scale-out Solution for Deep Packet Processing via Adaptive Load-Balancing", Local & Metropolitan Area Networks (LANMAN), 2011 18th IEEE Workshop on, IEEE, Oct. 13, 2011, p. 1-6, XP032021217.
Curtis, et al., "Mahout: Low-Overhead Datacenter Traffic Management using End-Host-Based Elephant Detection", IEEE INFOCOM 2011. Shanghai, China, IEEE, Piscataway, NJ, USA, Apr. 10, 2011, XP001562384.
Chinese Office Action dated May 24, 2016 with an English translation thereof.

* cited by examiner

| RULE | ACTION | STATISTICS |

| OFS NAME | NEIGHBOR OFS NAME | LOAD STATE |
|---|---|---|
| OFS3-1 | OFS3-2, OFS3-4 | LIGHT |
| OFS3-2 | OFS3-1, OFS3-3, OFS3-5 | HEAVY |
| OFS3-3 | OFS3-2, OFS3-6 | LIGHT |
| ⋮ | ⋮ | ⋮ |

NETWORK SYSTEM, CONTROLLER, AND LOAD DISTRIBUTION METHOD

TECHNICAL FIELD

The present invention is related to a network system, and especially to a load distribution technique of a network system.

BACKGROUND ART

A network system is known in which transfer processing of a packet by a switch and control processing of the switch are separated. In recent years, attention is drawn to an open flow network system which uses an open flow protocol, as an example of such a network system. The open flow network system is configured from an open flow controller and open flow switches. The open flow controller and each of the open flow switches are connected by a link of switch control which is called a secure channel. Thus, a transfer control of the packet can be carried out by the open flow controller and the open flow switches. The open flow controller sets a flow entry to the open flow switch and the open flow switch transfers the packet based on the flow entry.

In the open flow network, when the load of the open flow switch is heavy, there is a case that the open flow switch cannot respond immediately to a control request transmitted from the open flow controller to the open flow switch. In such a situation, the flow entry cannot be set to the open flow switch, so that a packet transfer delay and a packet loss occur.

A technique is demanded by which the situation that the packet cannot be transferred in the network system can be avoided, even if the remaining switches operate normally because the load of a specific switch becomes heavier.

Patent Literature 1 (JP 2011-151718A) and Patent Literature 2 (JP 2011-166384A) are known as references in the field of the present invention.

The Patent Literature 1 discloses a network system which prevents the packet loss through the change of a packet transfer route. The network system of Patent Literature 1 is composed of a route management server and a buffering unit. In the network system of Patent Literature 1, the route management server sets a transfer route of the packet destined to a second node from a first node. When the route management server changes the transfer route into a new transfer route, a transfer route is set which passes through the buffering unit. The buffering unit sends out the packet according to an instruction from the route management server. Thus, the packet loss due to the change of the packet transfer route is prevented.

Patent Literature 2 discloses a technique for improving the fault endurance of a computer system which uses an open flow technique. The computer system in Patent Literature 2 is composed of a plurality of controllers and a switch. A priority is assigned to each of the controllers. The controller sets a flow entry with a priority to the switch. The switch determines the permission or non-permission of the setting of the flow entry according to the priority, and carries out a relay operation according to the flow entry set to the switch. Thus, the flow entry can be set to the switch without any contradiction even if the plurality of controllers exist in the computer system. The computer system of Patent Literature 2 improves the fault endurance of the computer system by multiplexing controllers.

CITATION LIST

[Patent Literature 1] JP 2011-151718A
[Patent Literature 2] JP 2011-166384A

SUMMARY OF THE INVENTION

An object of the present invention is to provide a network system which can avoid a packet transfer delay due to the increase of switch load.

The network system of the present invention has switches, each of which transfers a packet, and a controller which sets a flow entry to each of the switches. The controller has a heavy load switch detecting section which detects a heavy load switch with a heavy load of new flow entry setting processing; a storage section which stores a switch list; an alternate route searching section which searches the switch list for an alternate route; and a flow entry setting section which assigns a flow of packets to be transferred based on a new flow entry of the heavy load switch to the switches on the alternate route, without changing the setting of the flow of packets to be transferred based on the flow entry which is already set to the heavy load switch.

A load distribution method is executed by a network system which includes switches, each of which transfers a packet, and a controller which sets a flow entry to each of the switches. The load distribution method includes: detecting a heavy load switch with a heavy load of new flow entry setting processing by a heavy load switch detecting section of the controller; searching a switch list for an alternate route in which the heavy load switch is not used, by an alternate route searching section of the controller; setting a new flow entry to the switches on the alternate route for a flow of packets to be transferred by the heavy load switch without changing the setting of the packets to be transferred by use of the flow entry which is already set to the heavy load switch, by a flow entry setting section of the controller.

According to the present invention, the network system can be provided which can avoid a transfer delay of packets due to the increase of the switch load.

DESCRIPTION OF THE EXEMPLARY EMBODIMENTS

A network system according to exemplary embodiments of the present invention will be described below with reference to the attached drawings.

(Structure)

Figure 1:
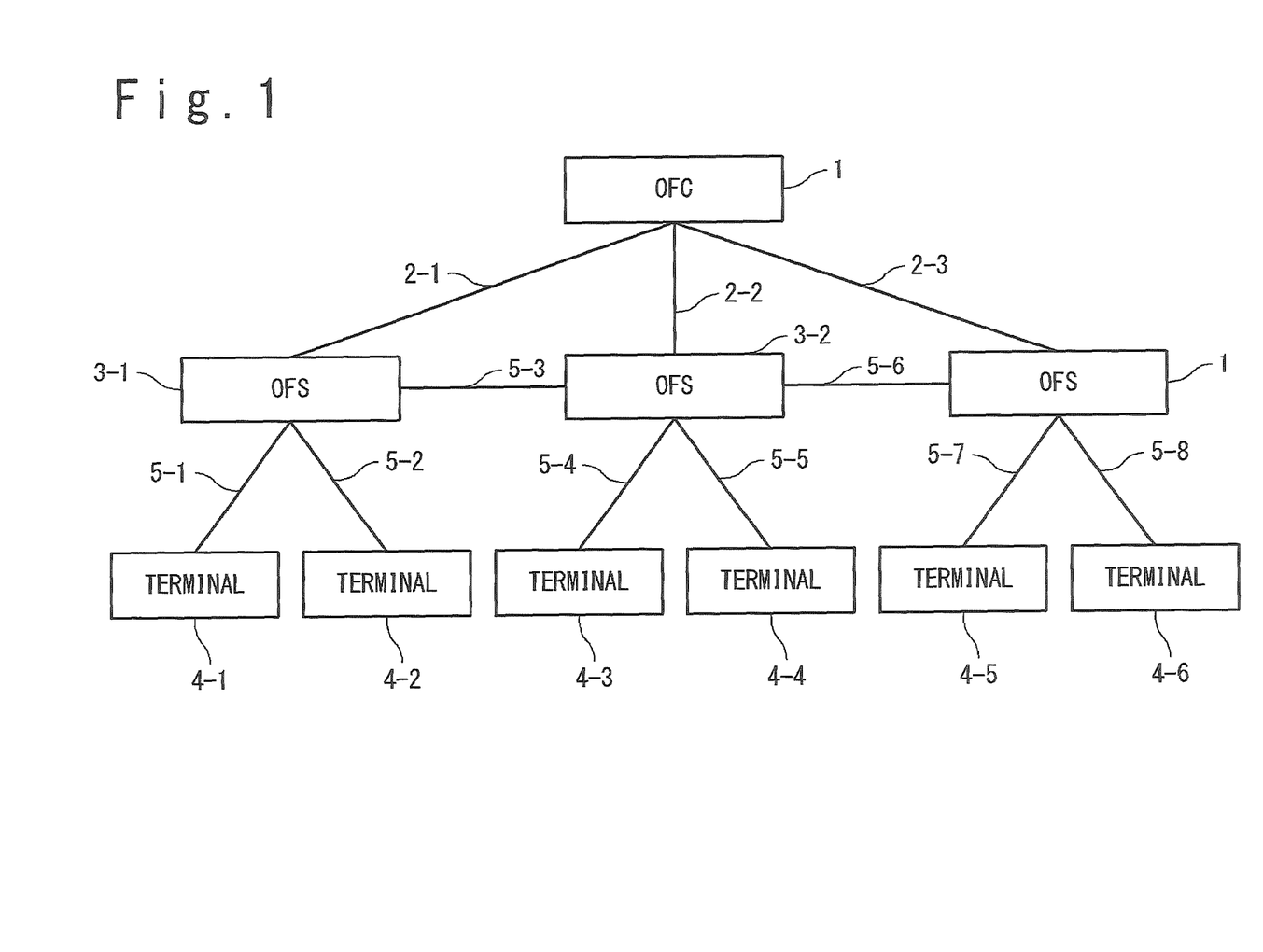
FIG. 1 is a whole configuration diagram of a network system according to an exemplary embodiment of the present invention.

First, the configuration of a network system according to an exemplary embodiment of the present invention will be described. FIG. 1 is a block diagram showing a configuration example of the network system according to the exemplary embodiment of the present invention. The network system of the present exemplary embodiment includes an open flow controller OFC 1, open flow switches OFS 3-1 to 3-3 and terminals 4-1 to 4-6.

The open flow controller OFC 1 is connected with the open flow switch OFS 3-1 through a secure channel 2-1. The open flow controller OFC 1 is connected with the open flow switch OFS 3-2 through a secure channel 2-2. The open flow controller OFC 1 is connected with the open flow switch OFS 3-3 through a secure channel 2-3. The open flow switches OFS 3-1 to 3-3 and the terminals 4-1 to 4-6 are connected through data transfer links 5-1 to 5-8.

Note that when the secure channels 2-1 to 2-3 are totally referred to without any distinguishment, they are referred to as a secure channel 2. When the open flow switches OFS 3-1 to 3-3 are totally referred to without any distinguishment, they are referred to as an open flow switch OFS 3. When the terminals 4-1 to 4-6 are totally referred to without any distinguishing, they are referred to as a terminal 4. When the data transfer links 5-1 to 5-8 are totally referred to without any distinguishment, they are referred to as the data transfer link 5. Also, in the network system of the present exemplary embodiment, when the open flow controller OFC 1, the open flow switch OFS 3 and the terminal 4 are not distinguished, they are merely referred to as a node. In the network system of the present exemplary embodiment, the number of open flow controllers OFC 1 and the number of open flow switches OFC 2 are optional. Also, the number of terminals 4 may be optional.

The secure channels 2-1 to 2-3 are links used for the open flow controller OFC 1 to transmit a control message to the open flow switches OFS 3-1 to 3-3. The control message is data of a flow entry to be set to the open flow switch OFS 3 and a request to be transmitted to acquire statistics about the flow (the number of transfer packets) from the open flow switch OFS 3.

Figure 2:
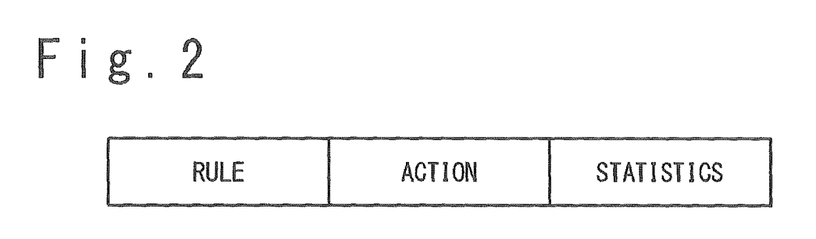
FIG. 2 is a diagram showing a flow entry in the exemplary embodiment of the present invention.

FIG. 2 is a diagram showing a flow entry in the exemplary embodiment of the present invention. The flow entry set to the open flow switch OFS 3 contains "a rule", "an action" and "statistics". The data to identify a packet is set in "the rule". For example, the rule is data of a combination of VLAN ID, the IP address of a packet transmission source, and so on. "The action" defines how the open flow switch OFS 3 should process the packet conforming to the data contained in "the rule". For example, the action defines the processing of transmit the packet to a node of a predetermined IP address from a predetermined port of the open flow switch OFS 3 and the processing of discarding the packet and so on in "the action". For example, by combining the "rule" and the "action", in case of the protocol number of 1 (ICMP), the operation of discarding the packet can be set to the open flow switch OFS 3. The "statistics" indicates statistic data for every flow entry. For example, the statistics are the number of transfer packets and the number of transfer octets.

The open flow switch OFS 3 carries out transfer processing of a packet in the network system of the present exemplary embodiment. The packet received by the open flow switch OFS 3 is transferred to another node based on the flow entry.

The terminal 4 is a PC, a server apparatus and so on. Note that a network printer and storage such as NAS (Network Attached Storage) may be connected with the open flow switch OFS 3.

Figure 3:
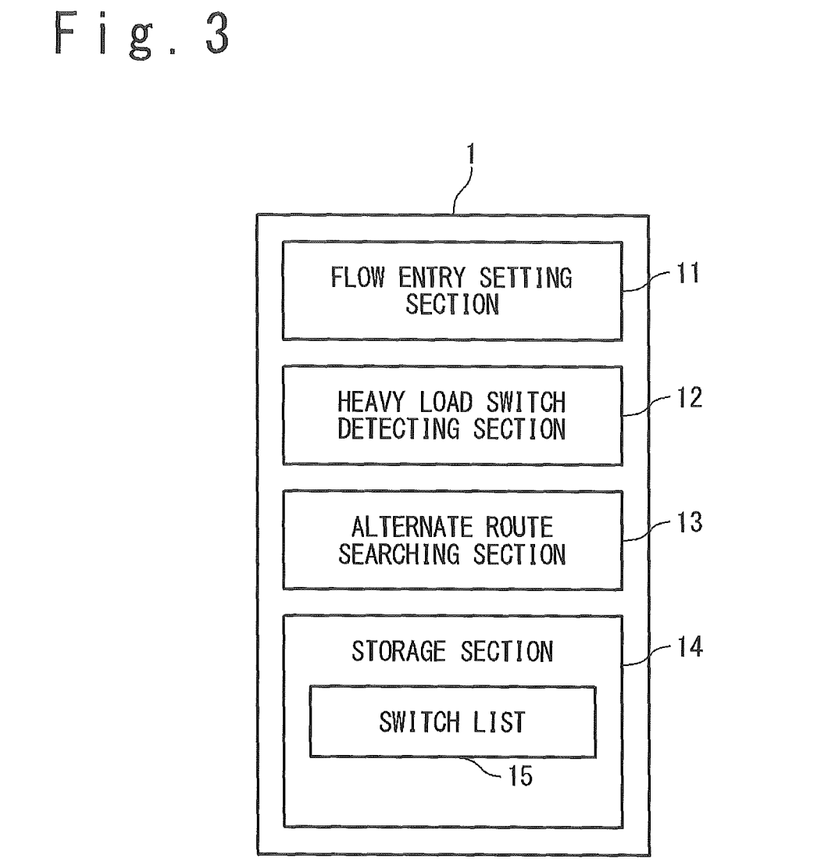
FIG. 3 is a block diagram of an open flow controller OFC 1 according to the exemplary embodiment of the present invention.

FIG. 3 is a block diagram of the open flow controller OFC 1 in the present exemplary embodiment of the present invention. The open flow controller OFC 1 in the network system of the present exemplary embodiment includes a flow entry setting section 11, heavy load switch detecting section 12, an alternate route searching section 13 and a storage section 14.

The heavy load switch detecting section 12 detects a heavy load switch in which the processing of setting a new flow entry is heavy. New flow entry setting processing contains a series of steps from a step of transmitting a new registration request of a flow entry from the open flow controller OFC 1 to the open flow switch OFS 3, a step of newly registering the flow entry in the open flow switch OFS 3, and a step of transmitting a response notifying the registration completion from the open flow switch OFS 3 to the open flow controller OFC 1.

Figure 4:
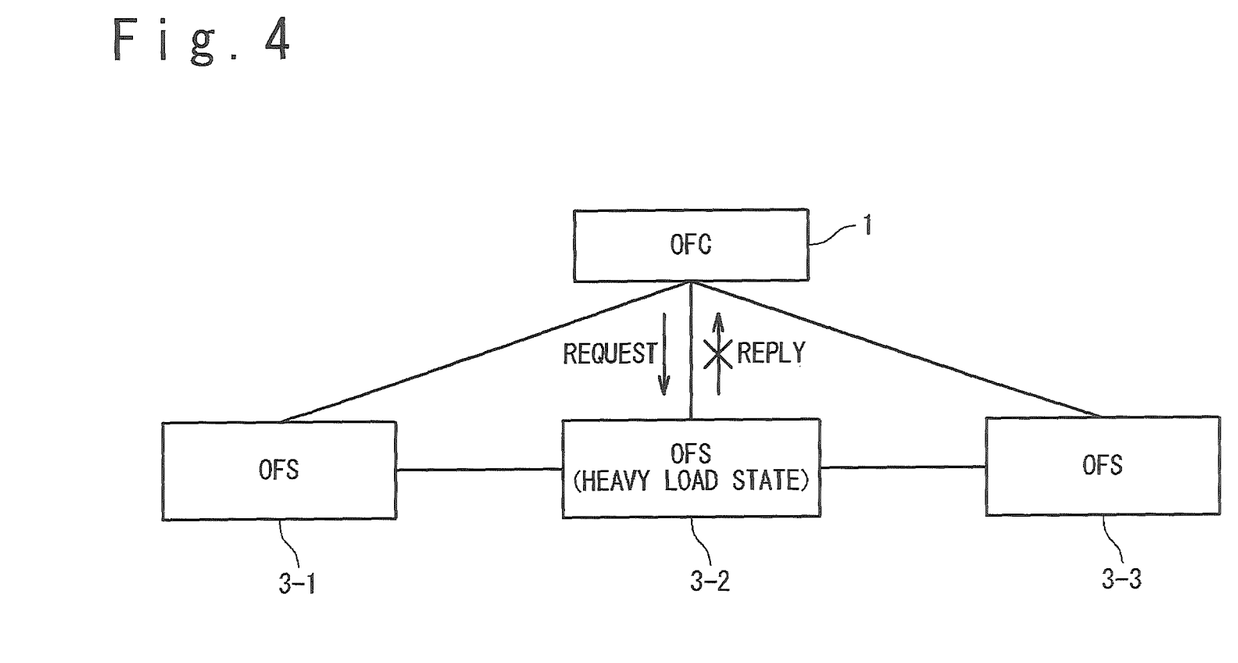
FIG. 4 is a diagram showing an example when the load of new flow entry setting processing becomes heavy in an open flow switch OFS 3 according to the exemplary embodiment of the present invention.

FIG. 4 is a diagram showing an example in which the load of the new flow entry setting processing became heavy in the open flow switch OFS 3 of the exemplary embodiment of the present invention. In the example of FIG. 4, the new flow entry setting processing in the open flow switch OFS 3-2 has become heavy. In such a case, even if the open flow controller OFC 1 transmits a new registration request of the flow entry to the open flow switch OFS 3-2, the response notifying the registration completion is not transmitted from the open flow switch OFS 3-2.

The following reason is considered as the reason that the new flow entry setting processing becomes heavy. For example, a case is considered that the secure channel 2 between the open flow controller OFC 1 and the open flow switch OFS 3 is congested so that it is difficult to transmit the new registration request of the flow entry and the response to it between the open flow controller OFC 1 and the open flow switch OFS 3. Also, a case is also considered that the heavy load is imposed due to the packet transfer processing based on a flow entry which is already set to the open flow switch OFS 3, so that the open flow switch OFS 3 cannot receive the new flow entry setting processing.

For example, as a method of detecting a heavy load switch by the heavy load switch detecting section 12, a barrier request and a CPU use rate in the open flow switch OFS 3 are exemplified.

The case where the heavy load switch detecting section 12 uses the barrier request for the detection of the load of new flow entry setting processing will be described. The barrier request is one of the control messages which are prescribed in the open flow protocol and is used as "notify" to confirm the perfection of the control of the open flow switch through the secure channel. The heavy load switch detecting section 12 transmits the barrier request to the open flow switch OFS 3 and when a response to the barrier request is not received by the open flow controller OFC 1 within a predetermined time, it is detected that the new flow entry setting processing in the open flow switch OFS 3 became heavy.

A case where the heavy load switch detecting section 12 uses a CPU use rate of the open flow switch OFS 3 for the detection of the load of new flow entry setting processing will be described. The heavy load switch detecting section 12 regularly transmits a control message for acquiring the CPU use rate of the open flow switch OFS 3, to the open flow switch OFS 3. The heavy load switch detecting section 12 detects that the load of new flow entry setting processing of the open flow switch OFS 3 became heavy when the CPU use rate of the open flow switch OFS 3 exceeds a predetermined threshold value.

Note that a person skilled in the art may appropriately determine a response time of the barrier request using for the detection of the load of new flow entry setting processing and a threshold value of the CPU use rate according to the environment of the network system.

Figure 5A:
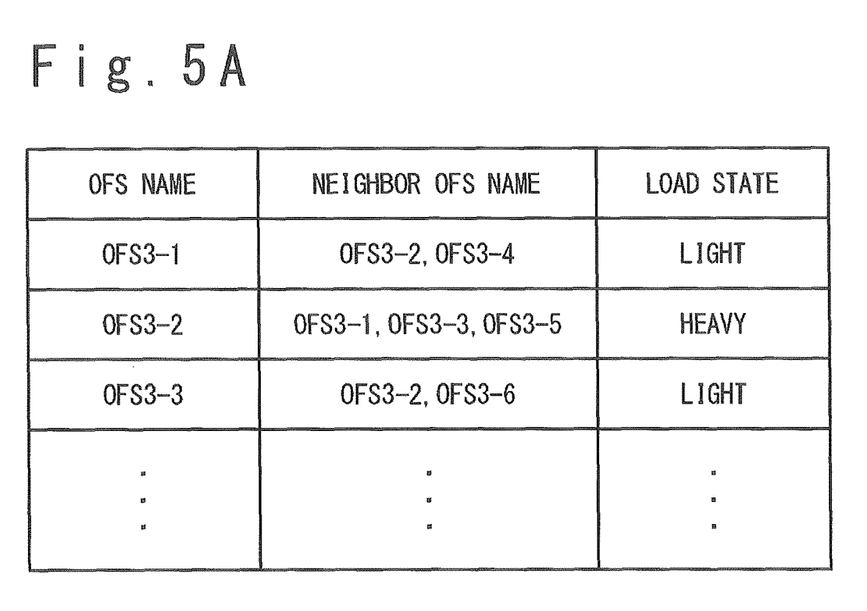
FIG. 5A is a diagram showing a switch list 15 in the exemplary embodiment of the present invention.
Figure 5B:
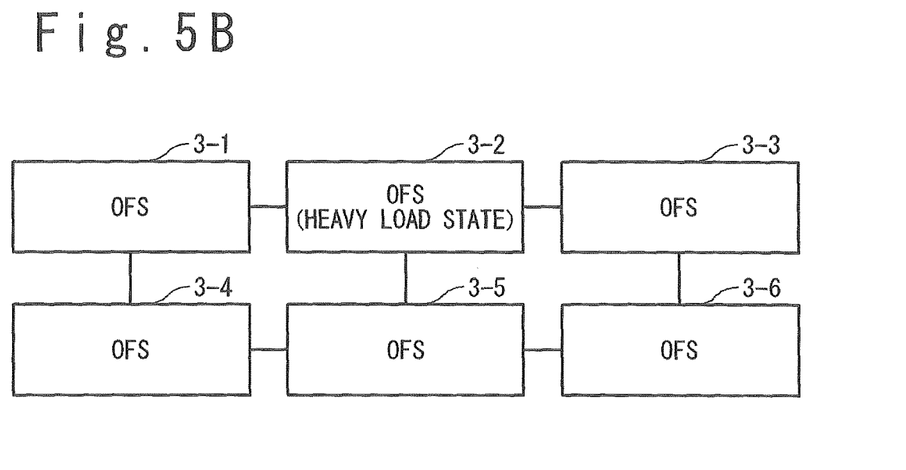
FIG. 5B is a diagram showing the open flow switch OFS 3 corresponding to the switch list of FIG. 5A.

The storage section 14 stores the switch list 15. FIG. 5A shows an example of the switch list 15 in the exemplary embodiment of the present invention. FIG. 5B is a diagram showing the state of the open flow switch OFS 3 in correspondence to the switch list of FIG. 5A. In the example of FIG. 5A, the switch list 15 manages an OFS name, a neighbor OFS name and a load state. Note that in the network system of the present exemplary embodiment, the load state of the switch list 15 shows whether the load of new flow entry setting processing is heavy or light.

Referring to the example of the switch list 15 of FIG. 5A, it is found that the open flow switches OFS 3 neighbor to the open flow switch OFS 3-1 are the open flow switch OFS 3-2 and an open flow switch OFS 3-4. Also, it is found that the low load state of the open flow switch OFS 3-1 is light. In addition, it is found that the open flow switches OFS 3 neighbor to the open flow switch OFS 3-2 are the open flow switch OFS 3-1, the open flow switch OFS 3-3 and the open flow switch OFS 3-5. Also, it is found that the high load state of the open flow switch OFS 3-2 is heavy. Moreover, it is found that the open flow switches OFS 3 neighbor to the open flow switch OFS 3-3 are the open flow switch OFS 3-2 and the open flow switch OFS 3-6. Also, it is found that the low load state of the open flow switch OFS 3-3 is light.

Note that in the example of FIG. 5A, data indicative of a connection relation with the open flow controller OFC 1 is not contained but data of the open flow controller OFC 1 may be included in switch list 15, in addition to the connection relation of the open flow switches OFS 3-1 to 3-6.

The alternate route searching section 13 searches the switch list for an alternate route in which a switch with the heavy load of new flow entry setting processing is not used or contained.

The flow entry setting section 11 sets a flow entry in the open flow switch OFS 3. When the heavy load switch detecting section 12 detects the open flow switch with the heavy load of new flow entry setting processing, the flow entry setting section 11 sets a flow of packets to be transferred based on the new flow entry of the switch, to another switch, as the flow entry which does not pass through the switch. Note that the flow entry setting section 11 does not change the setting for the packets transferred based on the flow entry which is already set in the switch.

Figure 6:
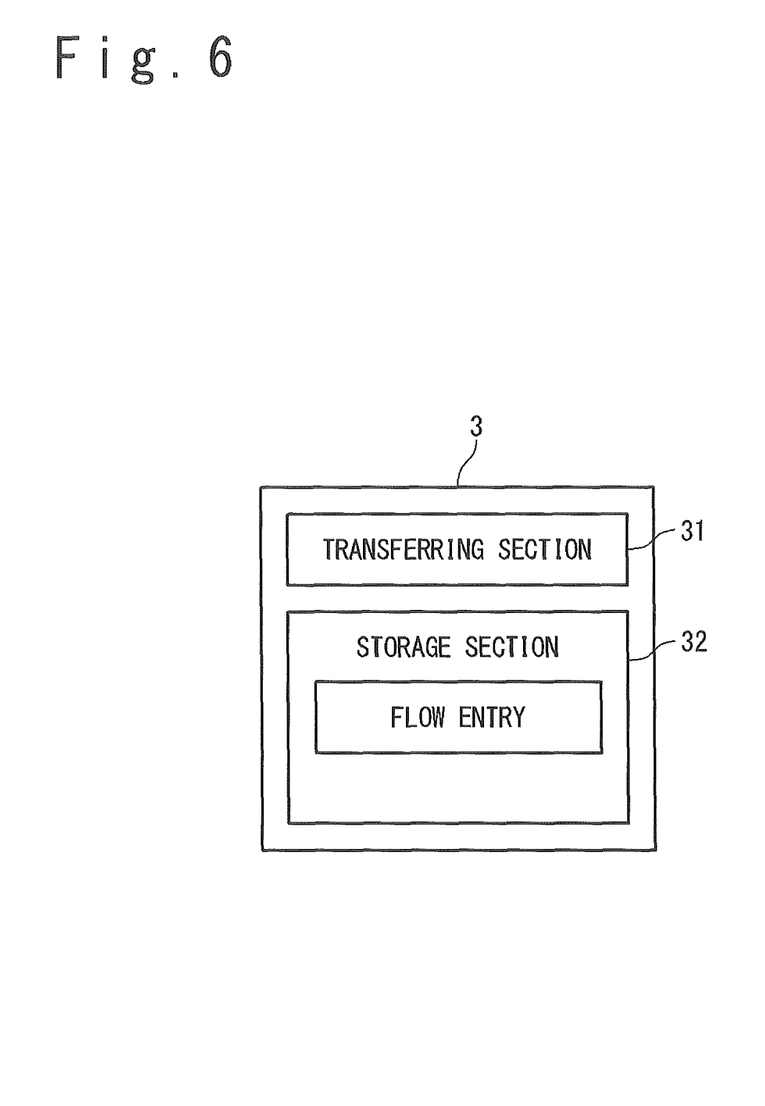
FIG. 6 is a block diagram of the open flow switch OFS 3 in the exemplary embodiment of the present invention.

FIG. 6 is a block diagram showing the open flow switch OFS 3 according to the exemplary embodiment of the present invention. The open flow switch OFS 3 in the network system of the present exemplary embodiment includes a transferring section 31 and a storage section 32. The transferring section 31 transfers a packet based on the flow entry stored in the storage section 32.

(Operation Method)

Figure 7:
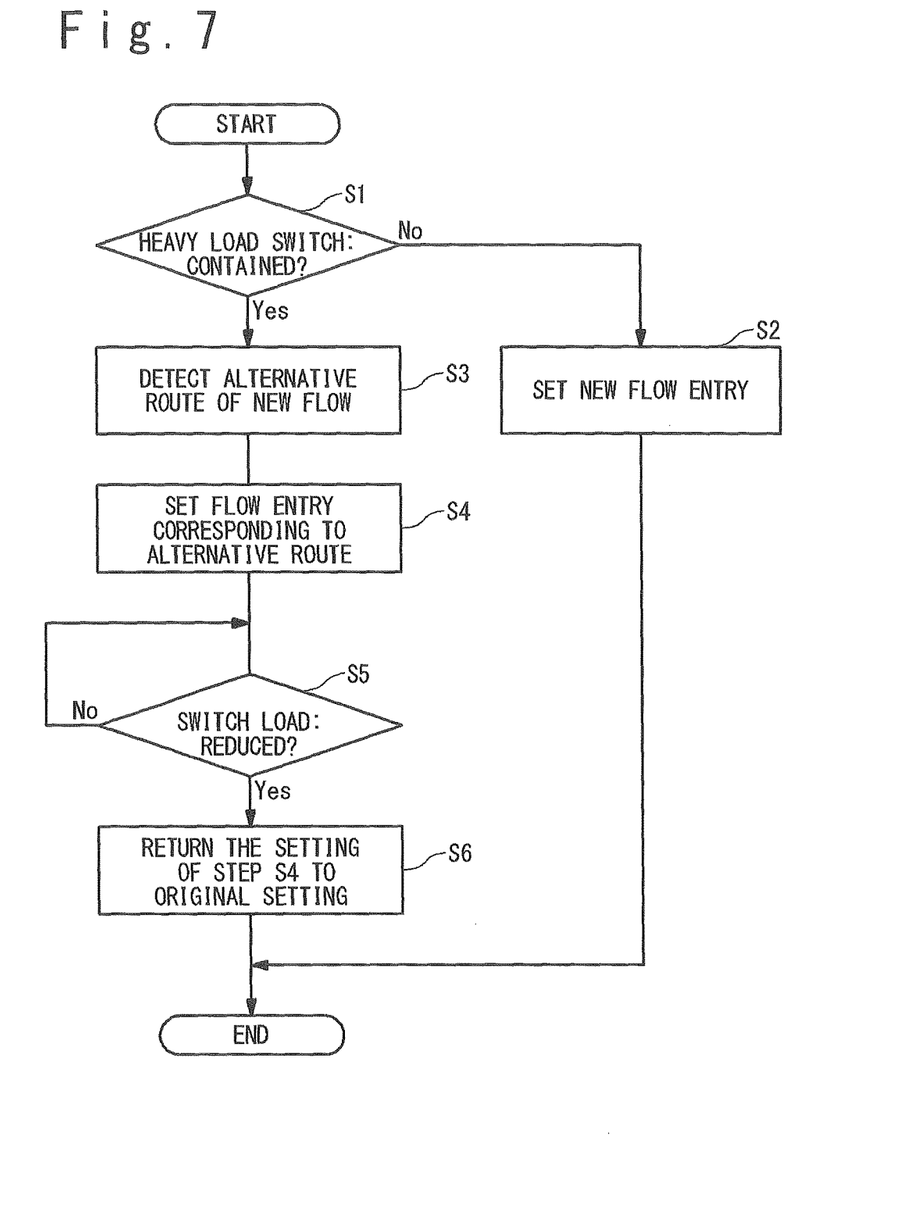
FIG. 7 is a flow chart showing a load distribution method in a network system according to the exemplary embodiment of the present invention.

Next, a load distribution method of the network system according to the present exemplary embodiment will be described. FIG. 7 is a flow chart showing the load distribution method of the network system according to the present exemplary embodiment.

(Step S1)

The flow entry setting section 11 checks and confirms whether or not the open flow switch OFS 3 detected by the heavy load switch detecting section 12 is contained in the open flow switches OFS 3 for the flow entry to be newly set. When the detected open flow switch OFS 3 is not contained, the control advances to a step S2 and when the detected open flow switch OFS 3 is contained, the control advances to a step S3.

(Step S2)

The flow entry setting section 11 newly sets a flow entry to the open flow switch OFS 3 which requires the setting for a new packet flow control. Because the setting processing of the new flow entry can be carried out as usually, the control ends without carrying out the load distribution processing.

(Step S3)

The alternate route searching section 13 searches an alternate route in which a switch with a heavy load of new flow entry setting processing is not used, based on the switch list 15. Here, a case where the heavy load switch detecting section 12 detects the open flow switch OFS 3-2 will be described by using it as an example.

Figure 8A:
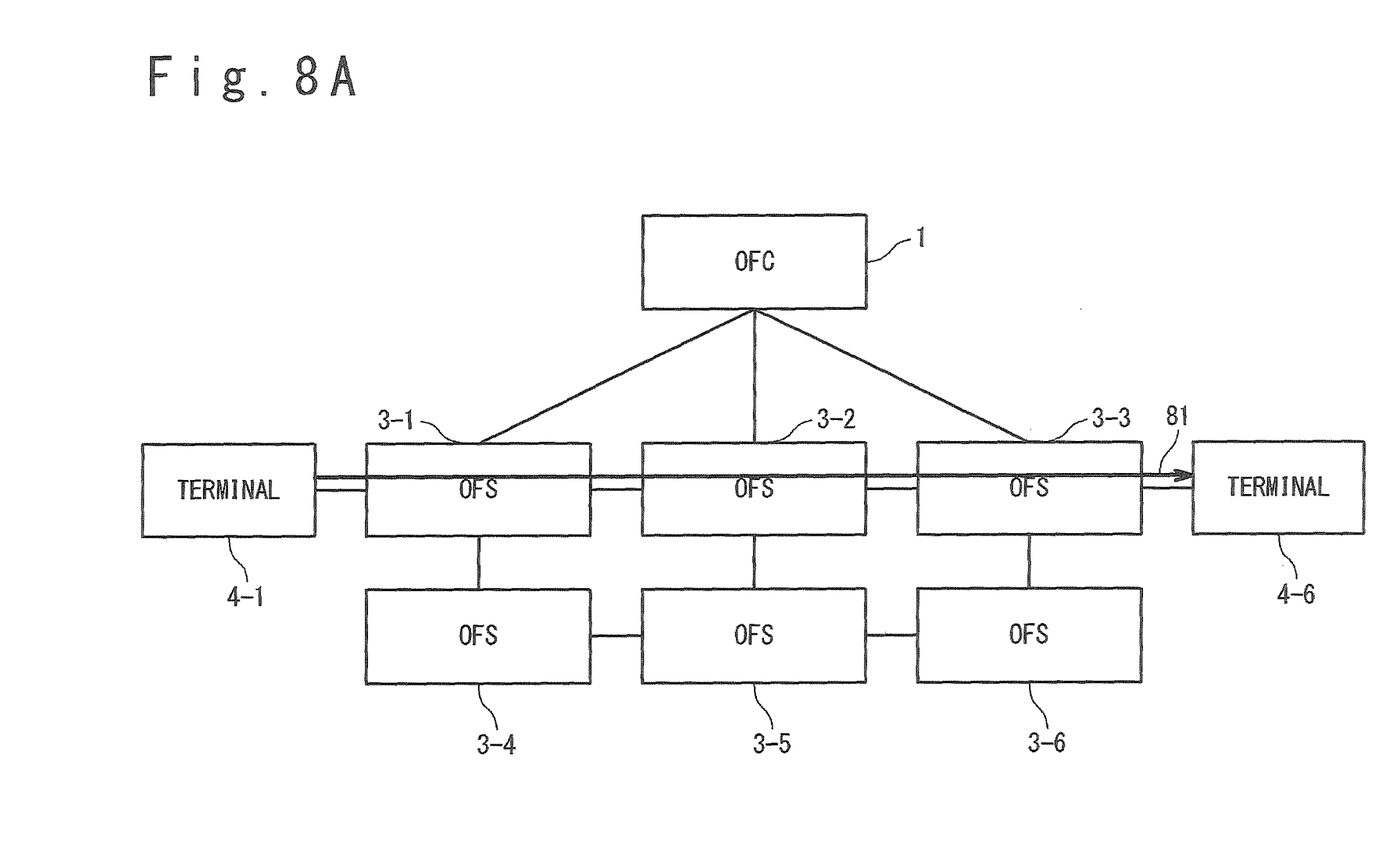
FIG. 8A is a diagram showing a change example of a packet transfer route in the network system of the exemplary embodiment of the present invention.
Figure 8B:
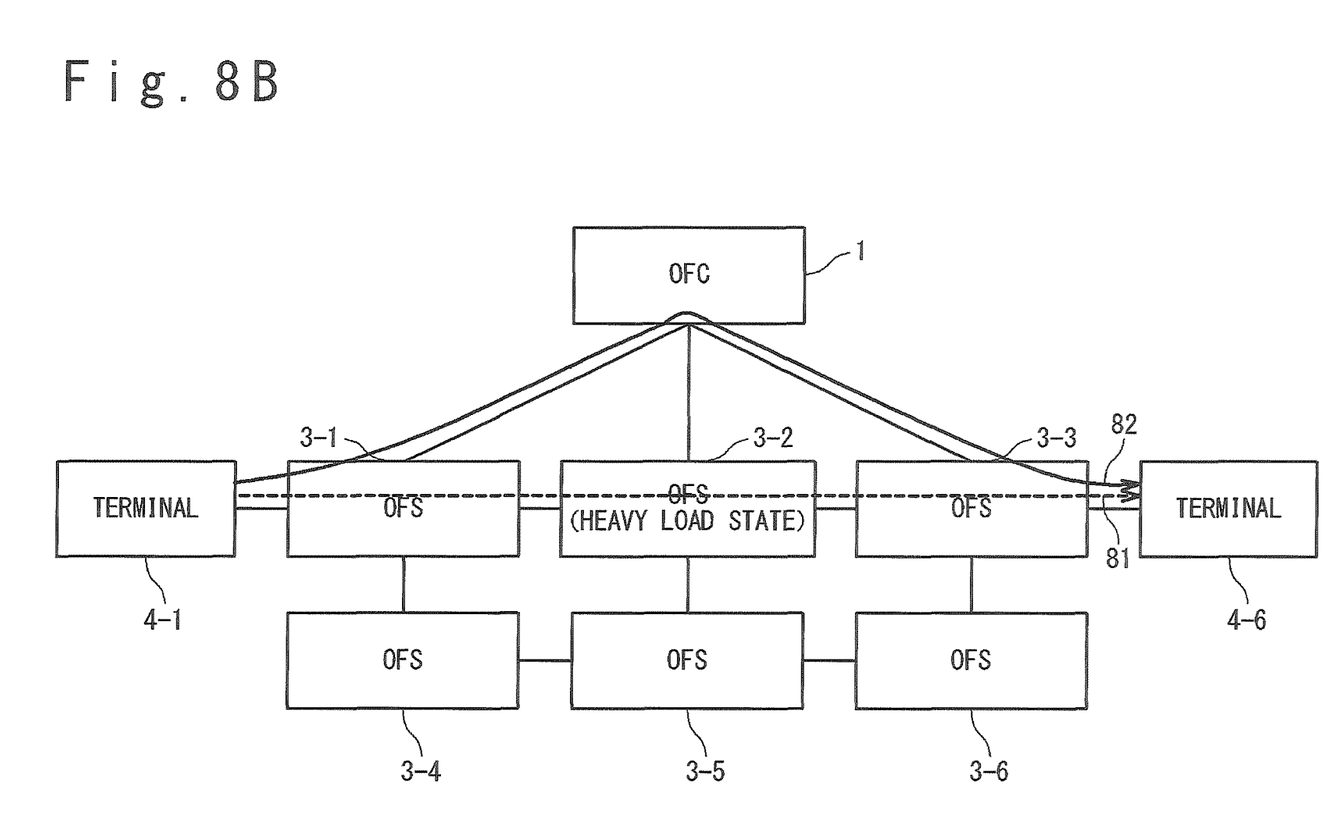
FIG. 8B is a diagram showing the change example of the packet transfer route in the network system in the exemplary embodiment of the present invention.
Figure 8C:
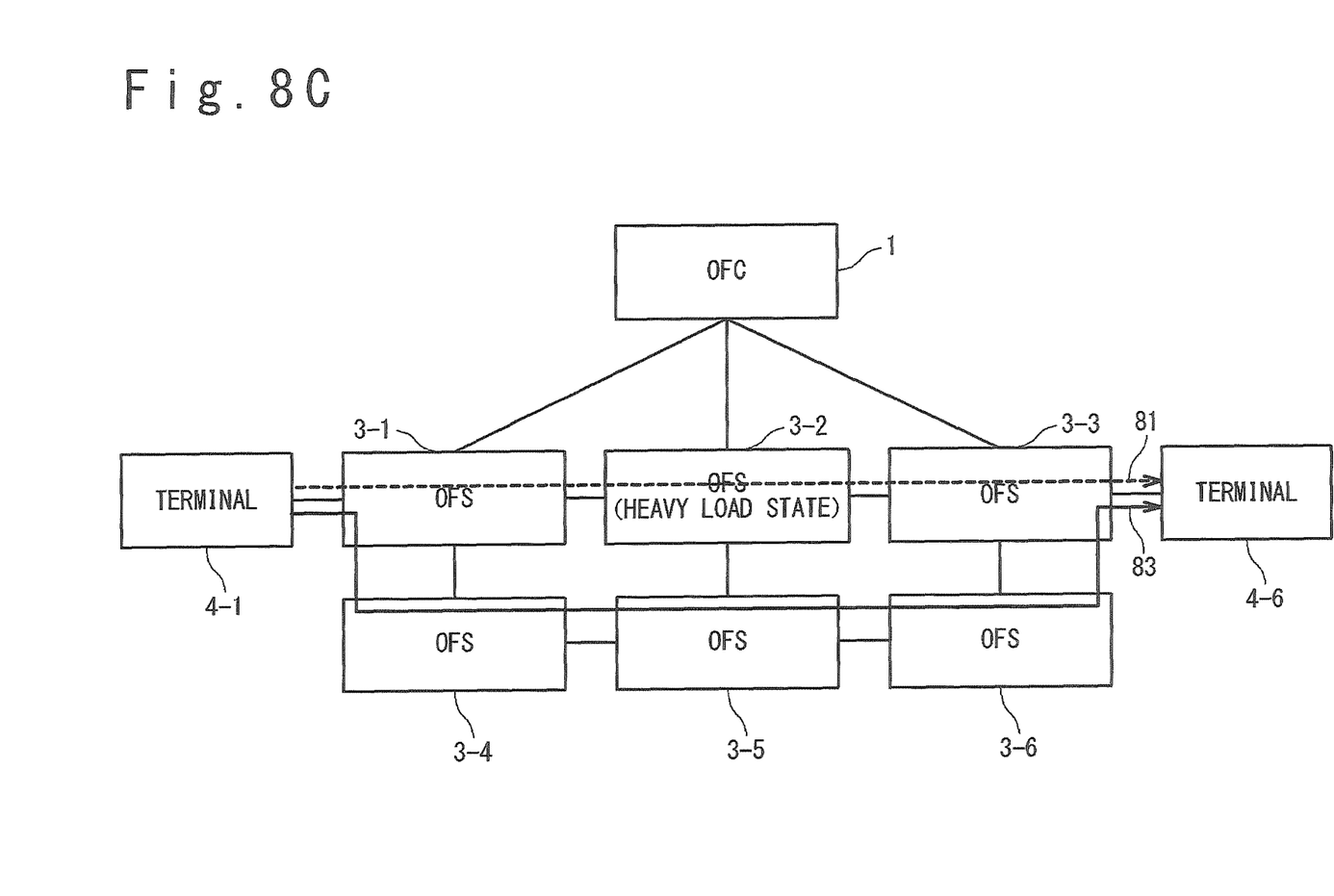
FIG. 8C is a diagram showing the change example of the packet transfer route in the network system of the exemplary embodiment of the present invention.

FIG. 8A to FIG. 8C are diagrams showing a change example of a packet transfer route in the network system according to the exemplary embodiment of the present invention.

FIG. 8A is a diagram showing an example in which a flow entry for a predetermined packet to be transmitted from the terminal 4-1 to the terminal 4-6 along a route 81 is set to the open flow switches OFS 3-1 to 3-3. In this case, it is supposed that the packet conforming to a rule A and the packet conforming to a rule B are transmitted on the route 81 as the predetermined packets.

Below, a case where the packet conforming to a rule C is newly transmitted in the above-mentioned condition by using the route 81 will be described.

The open flow controller OFC 1 must newly set a flow entry for the packet which conforms with the rule C to the open flow switches OFS 3-1 to 3-3. In this case, because the open flow switch OFS 3-2 detected by the heavy load switch detecting section 12 is contained, the alternate route searching section 13 searches an alternate route based on the switch list 15. The alternate route searching section 13 calculates a route 82 shown in FIG. 8B and a route 83 shown in FIG. 8C, as the search result of the alternate route. The open flow controller OFC 1 is contained in the route 82 but the open flow controller OFC 1 can be used for the alternate route in the network system of the present exemplary embodiment.

Note that when a plurality of alternate routes are detected like the route 82 of FIG. 8B and the route 83 of FIG. 8C, a method of determining the alternate route used for the packet transfer may be selected appropriately by a person skilled in the art by setting configuration data of the open flow switches OFS 3 based on band data of the transfer route.

Below, a case where the alternate route searching section 13 selects the route 82 of FIG. 8B as the alternate route will be described.

(Step S4)

The flow entry setting section 11 sets in the flow switches OFS 3-1 and 3-3, a flow entry for transferring packets corresponding to the packet conforming to the rule C on the route 82. That is, the flow entry is set in the open flow switch OFS 3-1 to transfer the packet conforming to the rule C to the open flow controller OFC 1. Also, the flow entry is set in the open flow switch OFS 3-3 to receive the packet conforming to the rule C from the open flow controller OFC 1.

Note that the flow entry setting section 11 does not change the flow entry which is already set to the open flow switch OFS 3-2 (the flow entry corresponding to the route 81 of the packet conforming to the rule A and the packet conforming to the rule B).

Thus, a packet flow (route 81) corresponding to the flow entry which is already set to the open flow switch OFS 3-2 is continuously used and the route 82 is used in the transfer of packets conforming to the rule C.

(Step S5)

The heavy load switch detecting section 12 checks and confirms whether or not the load of new flow entry setting processing to the open flow switch OFS 3-2 decreases so that the open flow switch OFS 3-2 has returned to a normal state. A method of determining whether or not the load decreased is the same as the method of detecting a heavy load state. That is, it is determined whether or not the load decreased based on the regular transmission of a barrier request and the regular monitoring of a CPU use rate of the open flow switch OFS 3. When the load has decreased, the control advances to a step S6.

(Step S6)

The flow entry setting section 11 returns the setting of the alternate route for the new packet flow at the step S3 (setting for use of the route 82) to the route 81 tried to be set at the start. That is, the flow entry setting section 11 carries out the setting of a flow entry in the open flow switch OFS 3-1 to transfer the packet conforming to the rule C to the open flow switch OFS 3-2. The flow entry setting section 11 carries out the setting of the flow entry for transferring the packet conforming to the rule C to the open flow switch OFS 3-3, in the open flow switch OFS 3-2. The flow entry setting section 11 carries out the setting of the flow entry for receiving the packet conforming to the rule C from the open flow switch OFS 3-2, in the open flow switch OFS 3-3.

According to the network system of the present exemplary embodiment, the open flow controller OFC 1 detects the load of new flow entry setting processing of the open flow switch OFS 3, and when the load is heavy, an alternate route is set to the open flow switch OFS 3. For this reason, problems of packet transfer delay and packet loss can be avoided because the new flow entry setting processing of the open flow switch OFS 3 cannot be completed.

Also, in the network system of the present exemplary embodiment, the flow control based on the alternate route is carried out only for the flow control of packets in the network corresponding to a new flow entry, and the existing flow entry which is set to the open flow switch OFS 3 with the heavy load continues to be used. Thus, the influence which the load distribution processing gives the whole network system can be suppressed.

In the above, the exemplary embodiments of the present invention have been described with reference to the attached drawings. However, the present invention is not limited to the above-mentioned exemplary embodiments and can be appropriately modified by a person skilled in the art in the range which does not deviate from the spirit and essence of the present invention.

This patent application claims a priority on convention based on Japanese Patent Application No. JP 2012-051397, and the disclosure thereof is incorporated herein by reference.

The invention claimed is:

1. A network system comprising:
a switch configured to transfer a packet; and
an external controller configured to set a flow entry for the packet to said switch,
wherein said external controller comprises:
a heavy load switch detecting section configured to detect said switch as a heavy load switch when said switch is in a heavy load state of new flow entry setting processing;
a storage section configured to store a switch list;
an alternate route searching section configured to search an alternate route which does not use said heavy load switch, from the switch list; and
a flow entry setting section configured to set a new flow entry for a new packet to a new switch on the alternate route searched by said alternate route searching section, and
wherein said alternative route includes said external controller.

2. The network system according to claim 1, wherein the packet is transferred by using the flow entry which is already set in said heavy load switch without a change of the already set flow entry by said flow entry setting section.

3. The network system according to claim 1, wherein said heavy load switch detecting section detects said switch as said heavy load switch when a response of a barrier request transmitted from said external controller to said switch is not returned within a predetermined time.

4. The network system according to claim 1, wherein said heavy load switch detecting section regularly monitors a CPU (Central Processing Unit) use rate of said switch, and detects that said switch is said heavy load switch, when the CPU use rate exceeds a predetermined threshold value.

5. The network system according to claim 1, wherein said flow entry setting section deletes the new flow entry for the alternate route when said heavy load switch detecting section detects that said switch changed from the heavy load state to a light load state, and sets the new flow entry for the new packet to said switch.

6. The external controller which is used for the network system according to claim 1.

7. The network system according to claim 1, wherein the flow entry setting section is configured to set the new flow entry for the new packet to the new switch on the alternate route searched by said alternate route searching section without setting the new flow entry to said heavy load switch.

8. The network system according to claim 1, wherein the external controller is separate from the switch.

9. The network system according to claim 1, wherein the alternate route searching section is configured to search as the alternate route, the external controller without the switch.

10. A load distribution method of a network system which comprises a switch which transfers a packet, and an external controller which sets a flow entry for the packet to said switch, said load distribution method comprising:

detecting said switch as a heavy load switch when said switch is in a heavy load state of new flow entry setting processing;

searching an alternate route which does not use said heavy load switch, from the switch list; and     setting a new flow entry for a new packet to a new switch on the alternate route searched, and     wherein said alternative route includes said external controller.

11. The load distribution method according to claim 10, wherein the packet is transferred by using the flow entry which is already set in said heavy load switch without a change of the already set flow entry by said flow entry setting section.

12. The load distribution method according to claim 10, wherein said detecting said switch as a heavy load switch, comprises:

detecting said switch as said heavy load switch when a response of a barrier request transmitted from said external controller to said switch is not returned within a predetermined time.

13. The load distribution method according to claim 10, wherein said detecting said switch as a heavy load switch comprises:

regularly monitoring a CPU (Central Processing Unit) use rate of said switch; and     detecting that said switch is said heavy load switch when the CPU use rate exceeds a predetermined threshold value.

14. The load distribution method according to claim 10, wherein said setting comprises:

detecting that said switch changed from the heavy load state to a light load state;

deleting the new flow entry for the alternate route; and     setting the new flow entry for the new packet to said switch.

15. The load distribution method according to claim 10, wherein the external controller is separate from the switch.

16. The load distribution method according to claim 10, wherein the searching of the alternate route includes searching the external controller without the switch.

17. A non-transitory computer-readable recording medium which stores a computer-executable program to make an external controller execute a load distribution method of a network system which comprises a switch which transfers a packet, and said external controller which sets a flow entry for the packet to said switch,     wherein said load distribution method comprises:

detecting said switch as a heavy load switch when said switch is in a heavy load state of new flow entry setting processing;

searching an alternate route which does not use said heavy load switch, from the switch list; and     setting a new flow entry for a new packet to a new switch on the alternate route searched, and     wherein said alternative route includes said external controller.

18. The non-transitory computer-readable recording medium according to claim 17, wherein the external controller is separate from the switch.

19. The non-transitory computer-readable recording medium according to claim 17, wherein the searching of the alternate route includes searching the external controller without the switch.

\* \* \* \* \*